(12) United States Patent
Wagner et al.

(10) Patent No.: US 10,515,369 B2
(45) Date of Patent: *Dec. 24, 2019

(54) MULTI-DEVICE TRANSACTION VERIFICATION

(71) Applicant: Visa International Service Association, San Francisco, CA (US)

(72) Inventors: Kim Wagner, Sunnyvale, CA (US); John F. Sheets, San Francisco, CA (US); Mark Nelsen, Oakland, CA (US); Jing Jin, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/214,553

(22) Filed: Dec. 10, 2018

(65) Prior Publication Data

US 2019/0114641 A1  Apr. 18, 2019

Related U.S. Application Data

(63) Continuation of application No. 15/072,636, filed on Mar. 17, 2016, now Pat. No. 10,210,521.

(Continued)

(51) Int. Cl.
*G06Q 20/40* (2012.01)
*H04W 12/08* (2009.01)
(Continued)

(52) U.S. Cl.
CPC ..... *G06Q 20/4016* (2013.01); *G06Q 20/3224* (2013.01); *H04L 63/08* (2013.01);
(Continued)

(58) Field of Classification Search
CPC ............ G06Q 20/4016; G06Q 20/3224; H04L 63/08; H04L 63/0861; H04W 12/06; H04W 12/08
See application file for complete search history.

(56) References Cited

U.S. PATENT DOCUMENTS 6,612,488 B2  9/2003  Suzuki
6,832,721 B2  12/2004  Fujii
(Continued)

FOREIGN PATENT DOCUMENTS

RU  2402814 C2  10/2010

OTHER PUBLICATIONS

How to pay with your smartphone without Apple Pay, Samsung Pay or Google Wallet, http://www.cnet.com/how-to/pay-with-your-phone-apps-apple-pay-samsung-pay/, downloaded Mar. 14, 2016.

(Continued)

*Primary Examiner* — Yonas A Bayou
(74) *Attorney, Agent, or Firm* — Kilpatrick Townsend & Stockton LLP

(57) ABSTRACT

When a user enters a resource provider location with a portable communication device, the portable communication device provides an indication to a transaction processing system that the portable communication device is currently at the resource provider location. At a later time when the user conducts a transaction with a portable transaction device, the fact that the user's portable communication device had been detected at the resource provider a short time ago is taken into account as a positive indicator that the transaction is not fraudulent. By verifying that both the portable communication device and the portable transaction device are present at the resource provider, the risk of approving a fraudulent transaction from a stolen portable transaction device can be reduced.

20 Claims, 7 Drawing Sheets

Related U.S. Application Data

(60) Provisional application No. 62/134,177, filed on Mar. 17, 2015.

(51) Int. Cl.
  *H04L 29/06* (2006.01)
  *H04W 12/06* (2009.01)
  *G06Q 20/32* (2012.01)

(52) U.S. Cl.
  CPC ......... *H04L 63/0861* (2013.01); *H04W 12/06* (2013.01); *H04W 12/08* (2013.01)

(56) References Cited

U.S. PATENT DOCUMENTS

| | | | |
|---|---|---|---|
| 6,868,391 B1 | 3/2005 | Hultgren | |
| 6,913,194 B2 | 7/2005 | Suzuki | |
| 6,948,656 B2 | 9/2005 | Williams | |
| 7,104,444 B2 | 9/2006 | Suzuki | |
| 7,152,788 B2 | 12/2006 | Williams | |
| 7,376,431 B2 | 5/2008 | Niedermeyer | |
| 7,500,607 B2 | 3/2009 | Williams | |
| 7,503,489 B2 | 3/2009 | Heffez et al. | |
| 7,594,605 B2 | 9/2009 | Aaron et al. | |
| 7,669,759 B1 | 3/2010 | Zettner | |
| 7,684,809 B2 | 3/2010 | Niedermeyer | |
| 7,697,942 B2 | 4/2010 | Stevens | |
| 7,743,981 B2 | 6/2010 | Willaims | |
| 7,747,535 B2 | 6/2010 | Mikan et al. | |
| 7,752,135 B2 | 7/2010 | Brown et al. | |
| 8,116,731 B2 | 2/2012 | Buhrrmann et al. | |
| 8,135,624 B1 | 3/2012 | Ramalingam et al. | |
| 8,140,403 B2 | 3/2012 | Ramalingam et al. | |
| 8,166,068 B2 | 4/2012 | Stevens | |
| 8,255,284 B1 | 8/2012 | Ramalingam et al. | |
| 8,280,348 B2 | 10/2012 | Snyder et al. | |
| 8,285,639 B2 | 10/2012 | Eden et al. | |
| 8,315,947 B2 | 11/2012 | Aaron et al. | |
| 8,341,029 B1 | 12/2012 | Ramalingam et al. | |
| 8,374,634 B2 | 2/2013 | Dankar et al. | |
| 8,401,906 B2 | 3/2013 | Ruckart | |
| 8,577,820 B2 | 11/2013 | Dalit | |
| 8,588,748 B2 | 11/2013 | Buhrrman et al. | |
| 8,615,465 B2 | 12/2013 | Boutcher et al. | |
| 8,632,002 B2 | 1/2014 | Boutcher et al. | |
| 8,831,564 B2 | 9/2014 | Ferguson et al. | |
| 8,839,394 B2 | 9/2014 | Dennis et al. | |
| 9,154,952 B2 | 10/2015 | Dennis et al. | |
| 9,185,123 B2 | 11/2015 | Dennis et al. | |
| 9,360,945 B2 * | 6/2016 | Boncyk | G06Q 20/10 |
| 9,578,107 B2 * | 2/2017 | Boncyk | G06K 9/228 |
| 9,721,251 B1 * | 8/2017 | Jen | G06Q 20/40 |
| 9,808,376 B2 * | 11/2017 | Boncyck | G06K 9/228 |
| 9,836,726 B2 * | 12/2017 | Abulafia | G06K 9/2054 |
| 2002/0147600 A1 * | 10/2002 | Waters | G06Q 20/04 705/39 |
| 2002/0194141 A1 | 12/2002 | Langensteiner et al. | |
| 2006/0194592 A1 | 8/2006 | Clough | |
| 2008/0162346 A1 | 7/2008 | Aaron et al. | |
| 2009/0063354 A1 * | 3/2009 | Sheets | G06Q 20/04 705/75 |
| 2009/0233579 A1 * | 9/2009 | Castell | G06Q 20/105 455/411 |
| 2011/0047075 A1 * | 2/2011 | Fourez | G06Q 20/32 705/44 |
| 2012/0166295 A1 * | 6/2012 | Loevenguth | G06Q 20/20 705/17 |
| 2013/0006784 A1 * | 1/2013 | Krauss | H04L 9/3231 705/18 |
| 2013/0132568 A1 | 5/2013 | Dankar et al. | |
| 2013/0262311 A1 | 10/2013 | Buhrmann et al. | |
| 2013/0268378 A1 | 10/2013 | Yovin | |
| 2013/0339247 A1 | 12/2013 | Lam | |
| 2014/0040155 A1 | 2/2014 | Buhrmann et al. | |
| 2014/0187205 A1 | 7/2014 | Dankar et al. | |
| 2014/0310160 A1 * | 10/2014 | Kumar | G06O 20/4016 705/39 |
| 2014/0272128 A1 | 12/2014 | Sheet et al. | |
| 2015/0017947 A1 | 1/2015 | Ferguson et al. | |
| 2015/0046330 A1 * | 2/2015 | Hanafi | G06Q 20/204 705/44 |
| 2015/0142623 A1 | 5/2015 | Ferguson et al. | |
| 2015/0310417 A1 | 10/2015 | Syed | |
| 2016/0012412 A1 | 1/2016 | Scanlon et al. | |
| 2016/0021537 A1 | 1/2016 | Dennis et al. | |

OTHER PUBLICATIONS

International Preliminary Report on Patentability, dated Sep. 28, 2017, in PCT Application No. PCT/US2016/022792, 10 pages.
Extended European Search Report, dated Jan. 23, 2018, in EP Applicdation No. 16765725.3, 8 pages.
Russian Office Action and Search Report dated Jun. 24, 2019 for RU 2017134358, English Translation only, 7 pages.

* cited by examiner

MULTI-DEVICE TRANSACTION VERIFICATION

CROSS-REFERENCE TO RELATED APPLICATIONS

This application is continuation application of U.S. patent application Ser. No. 15/072,636, filed Mar. 17, 2016, which is a non-provisional of and claims the benefit of the filing date of U.S. Provisional Application No. 62/134,177, filed on Mar. 17, 2015, which are herein incorporated by reference in their entirety for all purposes.

BACKGROUND

Electronic access transactions are susceptible to fraud. For example, a credit card can be stolen or fabricated, and used in a fraudulent card-present transaction at a merchant even though the true owner of the card is not present at the merchant. In another example, a person's access badge may be stolen and an unauthorized person may attempt to enter a location where they would not be otherwise authorized to enter.

With regard to fraudulent payment transactions, it has been reported that merchants are losing over $190 billion dollars per year in credit card fraud. Further, the ability for unauthorized users to access locations or data where they are not authorized to do so can present safety and security risks.

Increased security can be provided by simply implementing more and more authentication procedures. However, this is not desirable, because implementing too many authentication procedures can deter legitimate users from conduct legitimate transactions. For example, requiring a user to remember multiple passwords to conduct a single transaction can be so frustrating to the user, that the user may not want to conduct that transaction at all.

Embodiments of the invention address this and other problems, individually and collectively.

BRIEF SUMMARY

Embodiments of the invention are directed to systems and methods for ensuing that transactions are conducted by authorized users.

One embodiment of the invention is directed to a method. The method comprises receiving, by a server computer, device information and a resource provider identifier from a portable communication device of a user, wherein the resource provider identifier was received by the portable communication device from a base station at a resource provider identified by the resource provider identifier; receiving, by the server computer and from an access device in a transaction, an authorization request message comprising a credential or a token, after a portable transaction device provides the credential or token to the access device; and analyzing, by the server computer, the authorization request message to determine that the user of the portable communicate device is also using the portable transaction device to conduct the transaction at the access device.

Another embodiment of the invention is directed to a method comprising: receiving, by a server computer, device information and a resource provider identifier from a portable communication device of a user, wherein the resource provider identifier was received by the portable communication device from a base station at a resource provider identified by the resource provider identifier; determining a credential or a token from the device information; and transmitting the credential or the token, and a first biometric template to the portable communication device, wherein the portable communication device transmits the biometric template to the base station, wherein the base station receives a second biometric template from a biometric acquisition device that generates the second biometric template after receiving a biometric from a user, and compares the first and second biometric templates to determine if the user is authentic.

Other embodiments of the invention are directed to a server computers, each comprising: a processor; and a computer readable medium comprising code, executable by the processor, for implementing the above-described methods.

These and other embodiments of the invention are described in further detail below.

DETAILED DESCRIPTION

Figure 1:
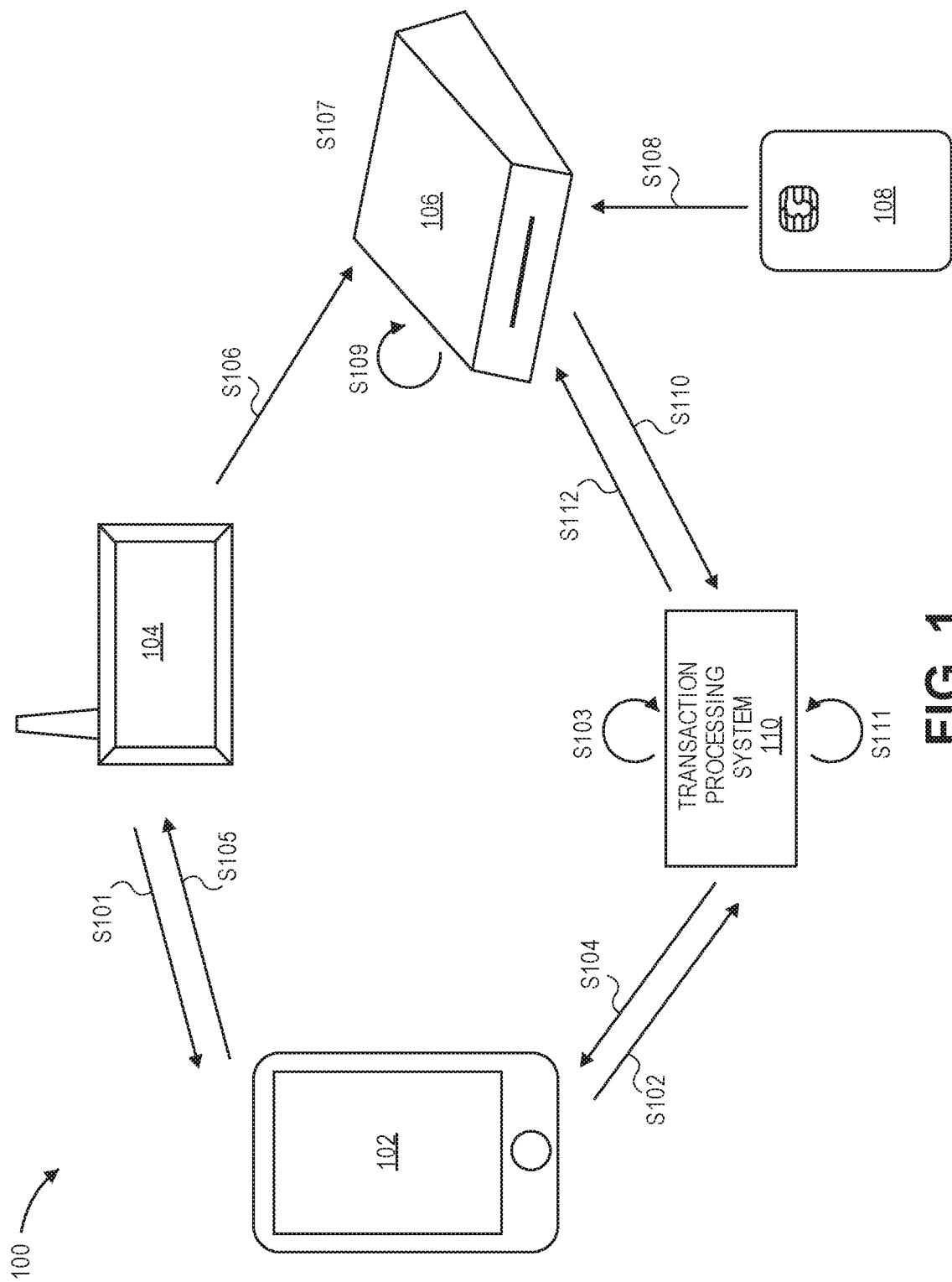
FIG. 1 shows a diagram of a system and a process flow according to embodiments of the invention.

Embodiments of the present invention provide techniques for verifying a transaction based upon the presence of a user's portable communication device being at a location such as a merchant location. As an illustration, in embodiments of the invention, when a user enters a merchant store with a portable communication device, the portable communication device provides an indication to a transaction processing system that the portable communication device is currently at the merchant location. At a later time, when the user conducts a transaction with a portable transaction device (which may be separate and different from the portable communication device), the fact that the user's portable communication device had been detected at the merchant store a short time ago is taken into account as a positive indicator that the transaction is not fraudulent. Embodiments of the invention can verify that both the portable communication device and the portable transaction device are present at the merchant before transactions can be authorized, thereby reducing the risk that fraudulent transactions can be conducted.

According to some embodiments, a process for verifying a transaction may include receiving device information from a portable communication device, and receiving an authorization request message from an access device to conduct a transaction. The authorization request message may include account credentials read from a portable transaction device and a merchant identifier associated with a merchant. The process may determine if the portable communication device is at the same merchant as the portable transaction device, and may include verifying the transaction.

Other embodiments of the invention relate to the use of biometric templates in authenticating access transactions such as payment transactions.

Although many of the specific examples described below relate to payments, embodiments of the invention can apply to other types of transactions including physical location access transactions (e.g., a transaction in which a user may wish to entire a venue such as a train terminal) and data request access transactions (e.g., a transaction in which a user may wish to access information about their plane flight at a kiosk in an airport).

Prior to discussing the details of some embodiments of the present invention, description of some terms may be helpful in understanding the various embodiments.

A "portable communication device" may be a portable device that can be transported and be operated by a user, and may include one or more electronic components (e.g., an integrated chip, etc.). A portable communication device according to an embodiment of the invention may be in any suitable form including, but not limited to a mobile phone (e.g., smart phone, cellular phone, etc.), a tablet computer, a portable media player, a personal digital assistant device (PDA), a wearable communication device (e.g., watch, bracelet, glasses, etc.), an electronic reader device, a laptop, a netbook, an ultrabook, etc. A portable communication device may also be in the form of a vehicle (e.g., a car) equipped with communication capabilities.

Portable communication devices according to embodiments of the invention can be configured to communicate with external entities such as remote communication gateways through long range communications technologies and protocols. They may also be configured to communicate with external entities such as access devices using any suitable short or medium range communications technology including Bluetooth (classic and BLE—Bluetooth low energy), NFC (near field communications), IR (infrared), Wi-Fi, etc.

A "portable transaction device" may be a portable device that can be used to conduct a transaction. A portable transaction device may include a storage technology (e.g., electronic memory, magnetic stripe, etc.) to store credentials or tokens associated with an account of a user. A portable transaction device can be in any of the forms described above with respect to the portable communication device, or in the form of a card (e.g., integrated chip card, magnetic stripe card) or a fob, etc. In some embodiments, the portable transaction device and the portable communication device may be the same device, and need not be separate devices. Specific examples of portable transaction devices can include wearable devices, payment cards such as credit, debit, and prepaid cards, vehicles with remote communication capabilities, etc.

A "server computer" may include a powerful computer or cluster of computers. For example, the server computer can be a large mainframe, a minicomputer cluster, or a group of servers functioning as a unit. In one example, a server computer may be a database server coupled to a Web server. A server computer may comprise one or more computational apparatuses and may use any of a variety of computing structures, arrangements, and compilations for servicing the requests from one or more client computers.

An "access device" may be any suitable device for providing access to an external computer system. An access device may be in any suitable form. Some examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a portable communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a portable communication device.

An "authorization request message" may be an electronic message that is sent to request authorization for a transaction. The authorization request message can be sent to a payment processing network and/or an issuer of a payment card. An authorization request message according to some embodiments may comply with ISO 8583, which is a standard for systems that exchange electronic transaction information associated with a payment made by a user using a payment device or payment account. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

An "authorization response message" may be an electronic message reply to an authorization request message. The authorization response message can be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant computer that indicates approval of the transaction. The code may serve as proof of authorization.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

A "value credential" may be information associated with worth. Examples of value credentials include payment credentials, coupon identifiers, information needed to obtain a promotional offer, etc.

A "payment credential" may include any suitable credential that can be used to conduct a payment transaction. Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc.

An "application" may be computer code or other data stored on a computer readable medium (e.g. memory element or secure element) that may be executable by a processor to complete a task.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN) and/or an expiration date. For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier.

A "token provider" or "token service system" can include a system that services payment tokens. In some embodiments, a token service system can facilitate requesting, determining (e.g., generating) and/or issuing tokens, as well as maintaining an established mapping of tokens to primary account numbers (PANs) in a repository (e.g. token vault). In some embodiments, the token service system may establish a token assurance level for a given token to indicate the confidence level of the token to PAN binding. The token service system may include or be in communication with a token vault where the generated tokens are stored. The token service system may support token processing of payment transactions submitted using tokens by de-tokenizing the token to obtain the actual PAN. In some embodiments, a token service system may include a tokenization computer alone, or in combination with other computers such as a transaction processing network computer. Various entities of a tokenization ecosystem may assume the roles of the token service provider. For example, payment networks and issuers or their agents may become the token service provider by implementing the token services according to embodiments of the present invention.

A "token domain" may indicate an area and/or circumstance in which a token can be used. Examples of the token domain may include, but are not limited to, payment channels (e.g., e-commerce, physical point of sale, etc.), POS entry modes (e.g., contactless, magnetic stripe, etc.), and merchant identifiers to uniquely identify where the token can be used. A set of parameters (i.e. token domain restriction controls) may be established as part of token issuance by the token service provider that may allow for enforcing appropriate usage of the token in payment transactions. For example, the token domain restriction controls may restrict the use of the token with particular presentment modes, such as contactless or e-commerce presentment modes. In some embodiments, the token domain restriction controls may restrict the use of the token at a particular merchant that can be uniquely identified. Some exemplary token domain restriction controls may require the verification of the presence of a token cryptogram that is unique to a given transaction. In some embodiments, a token domain can be associated with a token requestor.

"Token expiry date" may refer to the expiration date/time of the token. The token expiry date may be passed among the entities of the tokenization ecosystem during transaction processing to ensure interoperability. The token expiration date may be a numeric value (e.g. a 4-digit numeric value). In some embodiments, the token expiry date can be expressed as an time duration as measured from the time of issuance.

A "token request message" may be an electronic message for requesting a token. A token request message may include information usable for identifying a payment account or digital wallet, and/or information for generating a payment token. For example, a token request message may include payment credentials, mobile device identification information (e.g. a phone number or MSISDN), a digital wallet identifier, information identifying a tokenization service provider, a merchant identifier, a cryptogram, and/or any other suitable information. Information included in a token request message can be encrypted (e.g., with an issuer-specific key).

A "token response message" may be a message that responds to a token request. A token response message may include an indication that a token request was approved or denied. A token response message may also include a payment token, mobile device identification information (e.g. a phone number or MSISDN), a digital wallet identifier, information identifying a tokenization service provider, a merchant identifier, a cryptogram, and/or any other suitable information. Information included in a token response message can be encrypted (e.g., with an issuer-specific key).

A "resource provider" may be an entity that can provide a resource such as goods, services, information, and/or access. Examples of resource providers include merchants, data providers such as government agencies, transit agencies, etc. A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc. An authorizing entity may operate an authorization computer. An "issuer" may refer to a business entity (e.g., a bank) that issues and optionally maintains an account for a user. An issuer may also issue payment credentials stored on a user device, such as a cellular telephone, smart card, tablet, or laptop to the consumer.

An "account identifier" may include an identifier for an account. An account identifier may include an original account identifier associated with a payment account. For example, a real account identifier may be a primary account number (PAN) issued by an issuer for a card account (e.g., credit card, debit card, etc.). For instance, in some embodiments, a real account identifier may include a sixteen digit numerical value such as "4147 0900 0000 1234." The first six digits of the real account identifier (e.g., "414709"), may represent a real issuer identifier (BIN) that may identify an issuer associated with the real account identifier.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "cryptographic pattern" may include cryptographically secure data. Examples of cryptographic patterns may include cryptographic hashes, encrypted data, etc.

A "resource provider identifier" can include any suitable type of information that can identify a resource provider or a location of a resource provider. Examples of resource provider identifiers may include a merchant ID, a store ID, a device ID of a device at a resource provider location, a major value (e.g., a store major value), a minor value (e.g., a store minor value), etc.

FIG. 1 illustrates an system 100 according to an embodiment of the invention. The system 100 can be used to authenticate a user that is attempting to use a portable transaction device to conduct a transaction at a resource provider location.

System 100 includes a portable communication device 102 (e.g., a mobile phone), a base station 104 (e.g., an in-store Bluetooth low energy (BLE) base station or controller), an access device 106 (e.g., an in-store POS terminal), a portable transaction device 108 (e.g., a card), and a transaction processing system 110.

The transaction processing system 110 can be in communication with the portable communication device 102 and the access device 106. The base station 104 may be in communication with the portable communication device 102 and the access device 106.

A user (not shown) may operate the portable communication device 102 and a portable transaction device 108. If the user is an authentic user, then the portable communication device 102, the portable transaction device 108, the access device 106, and the base station 104 would all be located at the same location (e.g., the same merchant, the same entrance to a venue, etc.).

The communication between portable communication device 102 and transaction processing system 110 can be performed using a secure communication protocol such as transport layer security protocol, secure sockets layer protocol, or other suitable secure communication protocols.

The access device 106 and the base station 104 can be coupled together or communicate in any suitable manner. For example, the access device and the base station 104 may be connected by a physical wire, or may be connected through a short range wireless connection (e.g., as described below with respect to the base station 104).

In some embodiments, BLE (Bluetooth Low Energy) technology is used as the short range communication protocol or technology. Bluetooth Low Energy is a wireless personal area network technology used for transmitting data over short distances. It is designed for low energy consumption and cost, while maintaining a communication range similar to classic Bluetooth. BLE communication consists primarily of "advertisements," or small packets of data, broadcast at a regular interval by beacons (which may be present in or be a base station) or other BLE enabled devices via radio waves.

BLE advertising is a one-way communication method. Beacons that want to be "discovered" can broadcast, or "advertise" self-contained packets of data in set intervals. These packets are meant to be collected by devices like smartphones, where they can be used for a variety of smartphone applications to trigger things like push messages, app actions, and prompts. An optimal broadcast interval can be 100 ms. Broadcasting more frequently uses more battery life but allows for quicker discovery by smartphones and other listening devices. Standard BLE has a broadcast range of up to 100 meters.

BLE stations can also be present in the base stations in embodiments of the invention. BLE stations can allow for two way communication with a mobile communication device.

The transaction processing system 110, which can be implemented as a cloud based system or as a server computer system, can be remotely located with respect to the portable communication device 102, the portable transaction device 108, the access device 106, and the base station 104.

The entities in FIG. 1 and the other Figures may communication using any suitable communications networks. Suitable communications networks may be any one and/or the combination of the following: a direct interconnection; the Internet; a Local Area Network (LAN); a Metropolitan Area Network (MAN); an Operating Missions as Nodes on the Internet (OMNI); mesh networks, a secured custom connection; a Wide Area Network (WAN); a wireless network (e.g., employing protocols such as, but not limited to a Wireless Application Protocol (WAP), I-mode, and/or the like); and/or the like.

Prior to conducting a transaction, a user may enroll the portable communication device 102 for the transaction service by downloading a transaction application (e.g., a payment application, mobile wallet application, etc.) onto the portable communication device 102. The user then links the portable communication device 102 to one or more portable transaction devices (e.g., the portable transaction device 108). The information regarding the portable communication device 102 and the user may be stored in the transaction processing system 110.

Once the user is registered, the user walks into a merchant store with both the portable transaction device 108 and the portable communication device 102 installed with the transaction application. The merchant store may also include the access device 106 and the base station 104.

At step S101, base station 104 at the merchant store detects the enrolled portable communication device 102 and sends a wireless transmission (e.g., a beacon) to the portable communication device 102. The wireless transmission may include a merchant identifier (MID), and a store ID (SID). It may optionally include date/time information such as the current date and/or time (e.g., a time stamp). In some embodiments, the wireless transmission may include a base station ID, and portable communication device 102 may retrieve the MID and SID from the cloud or a remote server that has a mapping of base station IDs to the particular merchant and store where base station 104 resides.

Alternatively or additionally, the wireless transmission may include a major value such as a store major value, a minor value such as store minor value, and a UUID. The UUID may be a 16 byte string that is used to differentiate a large group of related base stations. The major value may be a two byte string used to distinguish a smaller subset of base stations within the larger group. The minor value may be a two byte string that is used to identify individual base stations. Together, the UUID, the major value and the minor value could be used to determine a specific physical location such as a merchant store.

At step S102, portable communication device 102 may send a cryptographic pattern request to the transaction processing system 110 to request a cryptographic pattern from transaction processing system 110. The cryptographic pattern request may include device information such as a device ID identifying the portable communication device 102 and/or a device fingerprint of portable communication device 102, as well as any or all of the data obtained from the base station 104 (e.g., the MID, SID, UUID, major, and minor), and time information (e.g., date and/or time) and also a random number to prevent replays. Examples of device identifiers may include IMEI numbers, MSISDN numbers, UDID (Universal Device ID) numbers, SIM card numbers, etc. Examples of device fingerprints may include unique serial numbers assigned to unique hardware, web browser fingerprints, etc. Device information may also include account identifiers or tokens specifically tied to a portable communication device 102. The device information in this example does not include real user credentials such as a real PAN. However, in other embodiments, instead of sending a device ID and/or device fingerprint, real credentials (or a token) may be sent by the portable communication device 102 to the transaction processing system 110.

At step S103, when transaction processing system 110 receives the cryptographic pattern request, transaction processing system 110 validates the device ID and device fingerprint against previous information provided from portable communication device 102 during enrollment to ensure that portable communication device 102 is an enrolled device, and that portable communication device 102 has not been hacked (e.g., jail-broken) or otherwise compromise with malware or viruses. The transaction processing system 110 then looks up an account identifier (e.g., a PAN) and expiration date (or token) associated with the portable communication device 102 using the device ID and/or device fingerprint (assuming that the PAN was not transmitted by the portable communication device 102). This can be done by electronically searching a database for the credential or token.

Once the account identifier and expiration date are obtained, the transaction processing system 110 generates a cryptographic pattern (e.g., PAN pattern). The cryptographic pattern can be based on the account identifier, the expiration date of the account identifier, and base station information such as one or more of the MID, SID, UUID, store major, store minor and the current date. In some embodiments, a nonce may be added to the cryptographic pattern to prevent replay attacks. In some embodiments, the cryptographic pattern can be the result of hashing these data elements and taking a predetermined number of bytes of the hashed data elements. The predetermined number of bytes may be the most significant four bytes of the hash result. In some embodiments, transaction processing system 110 may sign the cryptographic pattern using a private key of a public/private key pair. The transaction processing system 110 may also log the time of the cryptographic pattern request.

At step S104, transaction processing system 110 responds to the cryptographic pattern request by sending the generated cryptographic pattern to portable communication device 102.

At step S105, after the portable communication device 102 receives the cryptographic pattern, the portable communication device 102 forwards the cryptographic pattern to base station 104.

At step S106, after the base station 104 receives the cryptographic pattern, the base station 104 sends the cryptographic pattern to the access device 106. In embodiments in which the cryptographic pattern is signed by transaction processing system 110, either base station 104 or access device 106 can be provided with a corresponding public key of the private/public key pair to validate the signature.

At step S107, after receiving the cryptographic pattern, the access device 106 stores the cryptographic pattern (e.g., in a table).

At step S108, the user conducts a transaction by interacting portable transaction device 108 with access device 106. The portable transaction device 108 may interact with the access device 106 using any suitable contact based method (e.g., using a magnetic stripe or electrical contacts) or contactless based method (e.g., using NFC, Bluetooth, Wi-Fi, etc.).

At step S109, access device 106 reads the account credentials (e.g., account identifier such as a PAN, expiration date, etc.) stored on portable transaction device 108, and calculates its own cryptographic pattern. For example, access device 106 may calculate the cryptographic pattern by hashing the account identifier and expiration date read from portable transaction device 108, the MID and SID which access device 106 knows, and the current date, and taking the most significant four bytes of the hash result. Access device 106 then compares the locally generated cryptographic pattern against the list of cryptographic patterns received from base station 104, and makes a local decision regarding the processing options for this transaction. A matching cryptographic pattern can be used as a cardholder (e.g., user) verification method (CVM) indicating to the issuer (or other authorizing entity) that the portable communication device 102 is present. For example, if the locally generated cryptographic pattern matches a previously received cryptographic pattern, access device 106 may omit prompting the user for entry of a PIN or signature to improve the user experience since the matching cryptographic pattern verifies that the portable communication device 102 is present. Also, since the presence of the portable communication device 102 has been confirmed as being present, additional user verification methods (such as requests for PINs or signatures) need not be performed.

Access device 106 may then generate an authorization request message with a transaction verification result (TVR). In some embodiments, the transaction verification result can be an example of verification data and can be in any suitable form, and can be a bit set to indicate that the user's portable communication device 102 is present with the portable transaction device 108 at the merchant store.

At step S110, access device 108 sends the authorization request message including one or more of account credentials, a transaction cryptogram and the TVR bit to transaction processing system 110.

At step S111, the transaction processing system 110 (or a server computer in it) can analyze the authorization request message to determine that the user of the portable communication device 102 is also conducting the transaction at the access device 206. In some embodiments, this can be done by determining if the TVR is present in the authorization request message and determining if the TVR indicates that the access device 106 previously and successfully performed a cryptographic pattern matching process. If the TVR bit in the authorization request message indicates presence of the user's portable communication device 102, transaction processing system 110 may verify whether a cryptographic pattern request was recently received within an allowable time window for the particular account identifier. An allowable time window may depend upon the circumstances of the particular location. For example, if the transaction is a transit transaction, then the allowable time period may be the normal arrival and waiting time to departure on a particular vehicle to a particular destination. If the transaction is a department store, than the time window could be a couple of hours or less. If the transaction is at a fast food store, then the transaction time may be 30 minutes or less.

The transaction processing system 110 may also determine whether or not the transaction is authorized based upon other factors including whether there are sufficient funds or credit in the account that is being used to conduct the transaction. In other embodiments, the transaction processing system 110 may forward the authorization request to a downstream authorizing computer (not shown) and the authorizing computer may determine whether or not the transaction is authorized. If an authorizing computer makes the authorization decision, it will transmit an authorization response message back to the transaction processing system 110 with the authorization result.

At step S112, transaction processing system 110 sends the authorization response message to access device 106 indicating whether the transaction is approved or declined.

At the end of the day or at some other period of time, a clearing and settlement process can take place.

For this scenario, step S111 is used by the transaction processing system 110 to validate authorization requests against a record of cryptographic pattern requests. Otherwise, fraudsters may potentially come into a store with stolen cards and send their own, properly calculated cryptographic patterns to base station 104, and thereby bypass other CVMs when paying with the stolen cards. This kind of fraud can be caught by checking for each transaction with such a setting that transaction processing system 110 previously (and within the appropriate time window) had received a corresponding cryptographic pattern request.

It is possible to avoid having to check every authorization request in this way, by ensuring that fake cryptographic patterns are not introduced into the merchant's access device 106 or base station 104. One such mechanism can be where transaction processing system 110 signs the cryptographic pattern. The merchant can trust that any cryptographic pattern it sees comes from the transaction processing system 110 and not from a fraudster with stolen cards because the fraudster would not have the proper key to sign the cryptographic pattern. Base station 104 or access device 106 can have a public key with which to validate the signature. In this case, the signature may contain a nonce (e.g. a counter or random number) to avoid replay. The link between the base station 104 and access device 106 can communicate over a trusted connection to prevent a fraudster from injecting fake cryptographic patterns over that connection. In some embodiments, transaction processing system 110 may also perform audits or spot checks to verify received authorization requests against recent cryptographic pattern requests to ensure that a rogue merchant is not injecting its own fake cryptographic patterns, or just setting the corresponding bit regardless of the presence of any portable communication device.

Several actions may be taken to avoid theft in stores, where the thief then waits inside the store while the victim leaves the store (and not knowing that their portable transaction device 108 was stolen). For example, at the time of transaction, base station 104 can ping portable communication device 102 again. In this case, a mid-range wireless communication such as BLE is well-suited to estimate the distance to the portable communication device 102, so that the base station 104 can detect how far away the portable communication device 102 is to access device 106. A time-out for the cryptographic patterns can also implemented to force a renewal or refresh if passed. Different time windows may be used depending on the kind of store (fast food vs. furniture, for example).

Figure 2:
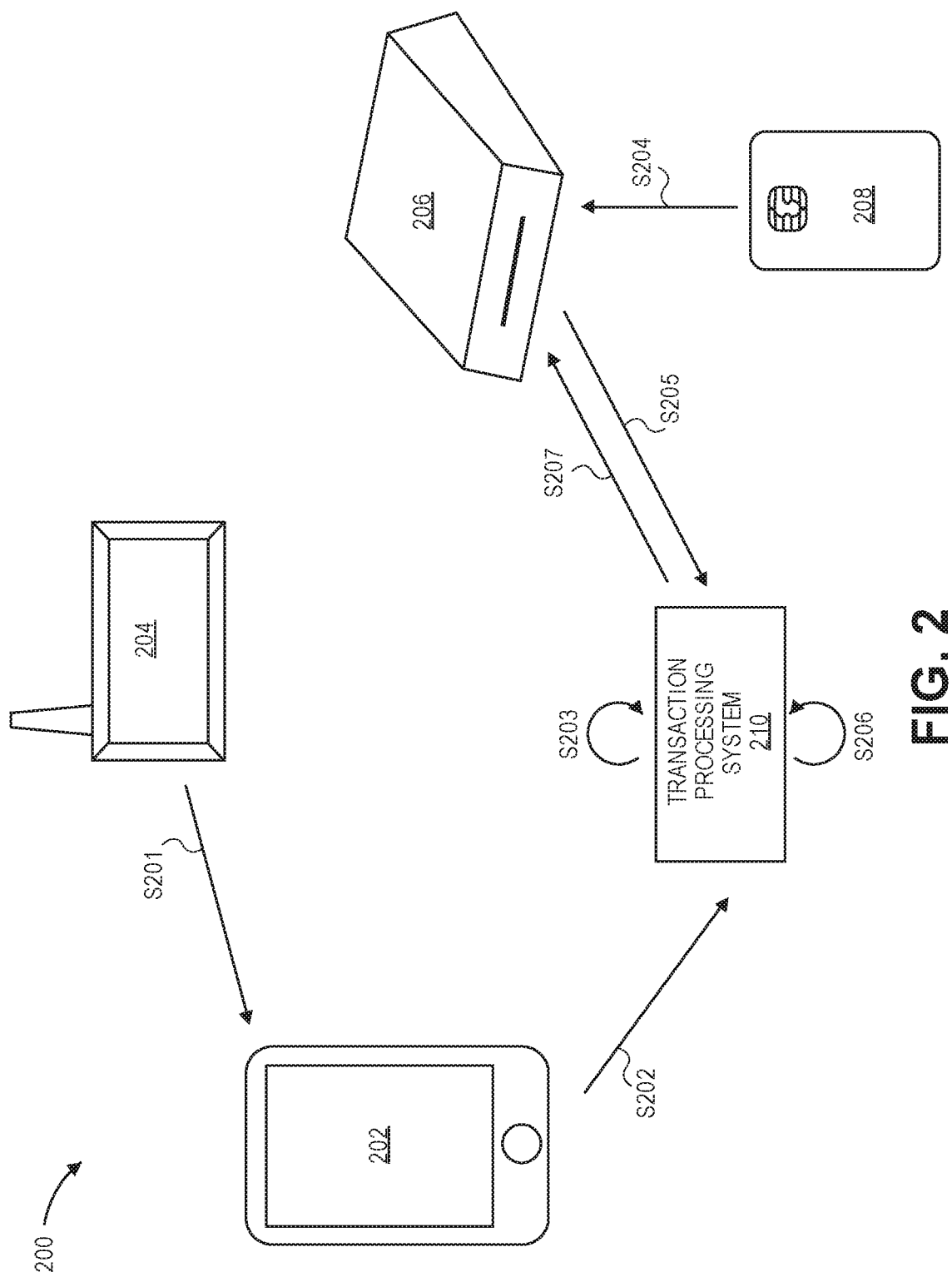
FIG. 2 shows a diagram of a system and a process flow according to other embodiments of the invention. In the system in FIG. 2, the base station only acts as beacon and does not receive information from portable communication devices.

FIG. 2 illustrates a system 200 that can utilize a base station that operates only as a beacon. System 200 includes similar components as those described with reference to FIG. 1. Elements 202, 204, 206, 208, and 210 in FIG. 2 can be similar to elements 102, 104, 106, 108, and 110 in FIG. 1, respectively. The transaction flow shown in FIG. 2 can be referred to as a "beacon-only" flow, because the base station 204 at the merchant store does not need to detect the presence of the portable communication device 202, but simply provides a one-way beacon that informs portable communication devices in the store about the merchant ID and store ID (or UUID, major, and/or minor) for that store. Portable communication device 202 can be registered and enrolled with the transaction processing system 210. The portable communication device 202 can then use the information from the base station 204 and can transmit it to transaction processing system 210 along with information from the portable communication device 202. This enables the transaction processing system 210 to see a transaction from an enrolled portable transaction device 208 and check if transaction processing system 210 has received information that the corresponding portable communication device 202 is in that store. This can be used by the transaction processing system 210 to conduct a stand-in approval/decline decision, or to forward this information to the issuer for the same purpose. In this scheme, a merchant would not know if the portable transaction device 208 is accompanied by a portable communication device 202 before transmitting the authorization request message. This scheme does not require additional logic at the access device 206, and hence reduces the need to modify existing resource provider equipment.

At step S201, base station 204 at the merchant store emits a wireless transmission (e.g., a beacon) with a beacon ID. In other embodiments, base station information 204 such as a UUID, a store major, and a store minor may be emitted in the wireless transmission.

At step S202, portable communication device 202 receiving the beacon ID (or other base station identification information) may send a device ID identifying the portable communication device 202, a device fingerprint of portable communication device 202, the received beacon ID, and date/time information (e.g., date and/or time) to transaction processing system 210. As in the embodiment in FIG. 1, the portable communication device 202 could alternatively transmit credentials or a token instead of the device ID and/or device fingerprint. The communication between portable communication device 202 and transaction processing system 210 can be performed using a secure communication protocol such as transport layer security protocol, secure sockets layer protocol, or other suitable secure communication protocols.

At step S203, when transaction processing system 210 receives the information from portable communication device 202, transaction processing system 210 validates the device ID and device fingerprint against previous information provided from portable communication device 202 during enrollment to ensure that portable communication device 202 is an enrolled device, and that portable communication device 202 has not been hacked (e.g., jail-broken) or otherwise compromised with malware or viruses. Transaction processing system 210 then looks up an account identifier (e.g., a PAN) and expiration date associated with the portable communication device 202, associates the account identifier to the beacon ID, and stores all of this information indicating that the user of portable communication device 202 is currently at a merchant store identified by the beacon ID in a database. The beacon ID may also have been stored in the database along with an additional resource provider identifier such as a merchant ID and/or an access device ID (e.g., a terminal ID). As noted above, the PAN or a token of the PAN could have been sent to the transaction processing system 210 by the portable communication device 202 in place of the device ID and/or device fingerprint. The transaction processing system 110 may also log the date and/or time when the request was received.

At step S204, the user conducts a transaction by interacting portable transaction device 208 with access device 206 at a later time. The portable transaction device 208 may interact with the access device 206 using any suitable contact based method (e.g., using a magnetic stripe or electrical contacts) or contactless based method (e.g., using NFC, Bluetooth, Wi-Fi, etc.). The access device 206 reads the account credentials (e.g., account identifier such as a PAN, expiration date, etc.) stored on portable transaction device 208, and generates an authorization request message. The authorization request message may include at least a transaction amount, a credential from the portable transaction device 208, a terminal ID and/or a merchant ID.

At step 205, the access device 206 sends the authorization request message to transaction processing system 210. At step S206, after receiving the authorization request message, the transaction processing system 110 (or a server computer in it) can analyze the authorization request message to determine that the user of the portable communication device 102 is also conducting the transaction at the access device 206. The transaction processing system can use the account credentials (e.g., account identifier) from the received authorization request message to find any associated beacon ID. Transaction processing system 210 then uses the beacon ID to determine if any merchant ID or terminal ID registered to the beacon ID matches the MID or terminal ID from the received authorization request message. If a match is found, then the transaction processing system 210 can verify that in fact the authentic user is in fact present at the specified location.

At step 207, the transaction processing system 210 may then send an authorization response message to access device 206 indicating whether an enrolled user was present based on whether there is match. As in the embodiments described with respect to FIG. 1, the transaction processing system 210 may perform authorization decisioning, or a downstream authorization computer may decide if the transaction is authorized.

At the end of the day or at some other period of time, a clearing and settlement process can take place.

In the beacon-only scenario, the transaction processing system 210 associates the information (e.g., beacon ID) provided by the base station 204 via the portable communication device 202 with the merchant ID and the terminal ID received in an authorization request message.

In some cases, the base station 204 can be a device that is not tied to any particular merchant. Each base station can be paired with a test transaction device with a test bank identification number (BIN), so that the test transaction device cannot be used for genuine purchases. Each test transaction device can be equipped with a unique test account identifier. Further, the beacon ID provided by the base station is tied to the test transaction device's unique test account identifier. Each base station has a unique beacon ID, which transaction processing system 210 can associate to the unique test account identifier on the test transaction device.

A merchant (or other resource provider) can install such a base station in the store, use the test transaction device that comes with it, and perform a transaction in each of their access devices. When transaction processing system 210 receives authorization request messages for transactions, the transaction processing system 210 can recognize the test account identifiers in the authorization request messages. The authorization request messages may also include merchant IDs, access device IDs and other information. The transaction processing system 210 can then determine that the transactions were conducted using the particular test transaction device used in conjunction with setting up the base stations. At this point, transaction processing system 210 uses the test account identifier to look up the beacon ID paired with the particular test transaction device. Transaction processing system 210 then creates an association from that beacon ID to the merchant ID and terminal ID from authorization request message for the transaction. In this manner, transaction processing system 210 associates the MID and terminal IDs with that beacon ID. When a user with an enrolled portable communication device enters a store that has a base station already set up, that portable communication device can transmit the beacon ID to transaction processing system 210, together with its device ID and device fingerprint, in effect telling transaction processing system 210 that the user is in that particular store.

It should be noted that although the access device has been illustrated as a POS terminal, both the interactive and beacon only scenarios can also be used at an access device such as an ATM for the issuer to gain confidence that the withdrawal is legitimate. Although the form factor of the ATM is different from a POS terminal, the flows would be similar to those described above.

It should be also noted that although the portable communication device is illustrated as a mobile phone, and the portable transaction device is illustrated as a card, in some embodiments other pairs of devices can be used. For example, the portable communication device can be a wearable device such as a watch, and the watch can be used with a mobile phone or a card acting as the portable transaction device to perform the transaction flows described herein. As another example, the portable communication device can be a vehicle equipped with communication capabilities operated by the user at a drive-thru, and the vehicle can be used with a mobile phone, a wearable device, or a card acting as the portable transaction device to perform the transaction flows described herein.

Furthermore, although the base station is illustrated as communicating with the portable communication device using Bluetooth low energy (BLE) protocol, other types of short/mid-range wireless communication protocols such as Bluetooth or WiFi can be used. BLE may be more suitable than other protocols due to its low energy consumption, ability to estimate distance of the portable communication device, and the ability of auto-connection to a BLE-enabled portable communication device.

The techniques described herein may also differ from GPS location-based verification in that according to some embodiments, the merchant can be provided with an indication as to whether the portable communication device is present at the merchant before the user conducts a transaction to allow the merchant to perform its own risk assessment of the transaction (e.g., to decide whether to omit requesting the user to enter a PIN or signature at checkout).

Figure 3:
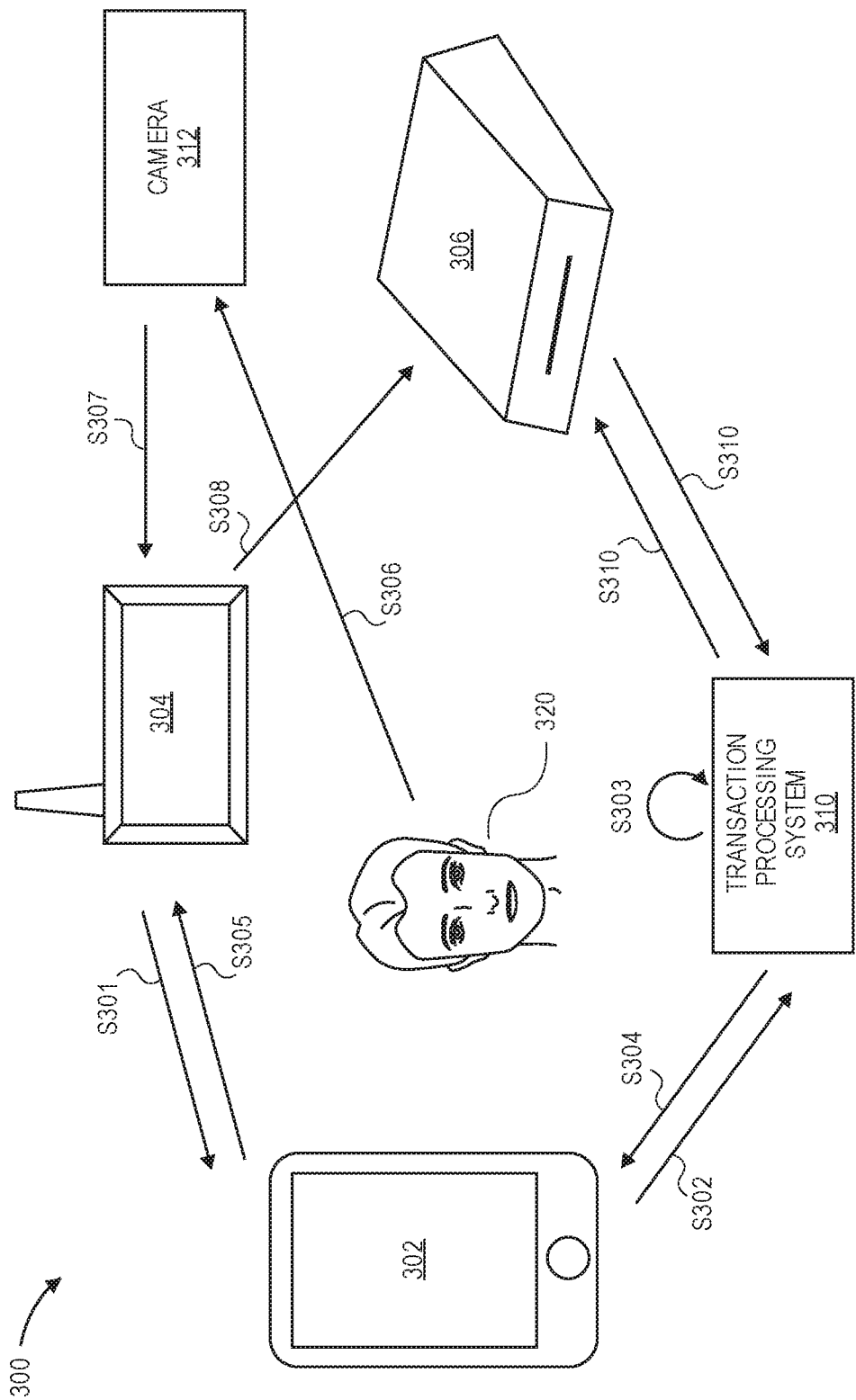
FIG. 3 shows a diagram of a system and a process flow according to yet other embodiments of the invention. The system in FIG. 3 is adapted to obtain a biometric sample from a user at a location.

FIG. 3 illustrates a system 300 that can implement a biometric recognition process. System 300 includes similar components as those described with reference to FIGS. 1 and 2. Elements 302, 304, 306, and 310, can be similar to elements 102 and 202, 104 and 204, 106 and 206, and 110 and 210 in FIGS. 1 and 2, respectively. FIG. 3 also illustrates a camera 312 (an example of a biometric acquisition device) which can take an image of a user's face. Although a camera is disclosed as a biometric acquisition device, other types of biometric acquisition devices and other types of biometric samples may be obtained. For example, fingerprints, voice samples, iris scans, and other types of biometric samples may be captured by suitable biometric acquisition devices and converted to corresponding biometric templates (which may be date representing biometric samples such as photographs).

For the BLE use cases happening in a store (as opposed to at an ATM), facial recognition can help to disambiguate customers at or near the cash register. The scenario is that the store has sensed the presence of the customer's mobile device as they enter the store. As described above, information is passed back to the transaction processing system or the user's issuer that identifies the user (e.g., a payment cardholder) and also which store they are located at. When the user is at or near the cash register, a camera in the store can now capture images of the user's face and use those images to identify the user. The identification can be done in several different ways.

One way would be that at the time the transaction processing system 310 receives information about the user's portable communication device 302 being in the store, the transaction processing system 310 can forward a reference picture of the user's face to the store to use for identification, together with a payment token. The store would use the reference picture to perform the identification, and once identification had been achieved, could use the payment token for payment. Identification would be feasible because the store would have a limited number of images to compare against, limited by the number of enrolled customers currently in that particular store.

Another way could be that the store would instead transmit the images back to the transaction processing system 310 and the transaction processing system 310 would perform the identification. Here, identification would be possible because of the limited number of people in any particular store at any particular time.

In either case, the payment can be initiated upon confirmation of the identity of the user at the cash register, together with capture in some form of that user's consent to pay the specified amount. This capture could be done photographically as well, and supplied upon demand by the merchant to the transaction processing system 310. The user 320 could have, but does not need to have a portable transaction device.

Referring to FIG. 3, in step S301, a user 320 in possession of a portable communication device 302 may enter a store with the base station 304. The base station 304 detects an enrolled portable communication device 302, and transmits a merchant ID, store ID, and date to the portable communication device 302. As in prior embodiments, the base station 304 could also or alternatively transmit a UUID, store major, and store minor to the portable communication device 302.

At step S302, the portable communication device 302 transmits a device ID, device fingerprint, merchant ID, store ID, and a date and time to the transaction processing system 310.

At step S303, after the transaction processing system 310 receives the data from the portable transaction device 302, the transaction processing system 310 validates the session and device fingerprint against the device ID. If the device fingerprint and device ID are valid, then the transaction processing system 310 can determine an account credential or token from the received device information. In some embodiments, the transaction processing system 310 can look up a primary account number associated with the device fingerprint and/or the device ID. Using the primary account number, the transaction processing system 310 can look up a reference photo and a payment token associated with the primary account number. The reference photo may have been previously provided to the transaction processing system 310 by the user, and the data representing the reference photo may be in any suitable form (e.g., a bitmap image file, a JPEG file, GIF file, etc.).

At step S304, a first biometric template such as the data representing the reference photo ("reference photo data"), and the payment token are transmitted by the transaction processing system 310 to the portable communication device 302.

At step S305, the first biometric template and the payment token are transmitted from the portable communication device 302 to the base station 304.

At step S306, upon receiving the first biometric template data and the payment token from the portable transaction device 302, the base station 304 may send a signal to the camera 312 to cause it to take a picture of the user's face 320.

At step S307, once captured, a second biometric template such as data representing the picture of the user's face may be provided by the camera 312 to the base station 304. At this point, the base station 304 may compare the first and second biometric templates (e.g., comparing the data representing the picture of the user's face with the reference photo data received from the portable communication device 302). If there the received data match, then as shown in step S308, the payment token can be transmitted to the access device 306. Although this example describes the base station 304 doing the comparison of the captured photo of the user and the reference photo data, it is understood that this comparison can be performed by any suitable device or even by store personnel.

At step S309, after the access device 306 receives the payment token, the access device 306 may generate and then transmit an authorization request message to the transaction processing system 310. The authorization request message may comprise the payment token, an expiration date, a transaction amount, a merchant ID, a terminal ID, and other information. At this point, the transaction processing system 310 may determine the primary account number from the token and may authorize or not authorize the transaction. In other embodiments of the invention, the transaction processing system 310 may forward the authorization request message with the primary account number to an authorizing computer (not shown in FIG. 3) for authorization and the authorizing computer may determine whether or not to authorize the transaction.

At step S310, the transaction processing system 310 may transmit an authorization response message to the access device 306. If the authorization request message was previously transmitted to an authorizing computer, then the transaction processing system 310 may first receive the authorization response message from the authorizing computer. As noted above, a clearing and settlement process may be subsequently performed.

The system and method described above with respect to FIG. 3 has a number of advantages. For example, as illustrated above, the user does not need to have a separate portable transaction device. The user may simply enter a location, and a resource provider or a device operated by the resource provider can confidently allow the transaction to proceed by simply validating a biometric sample of the user.

Figure 4:
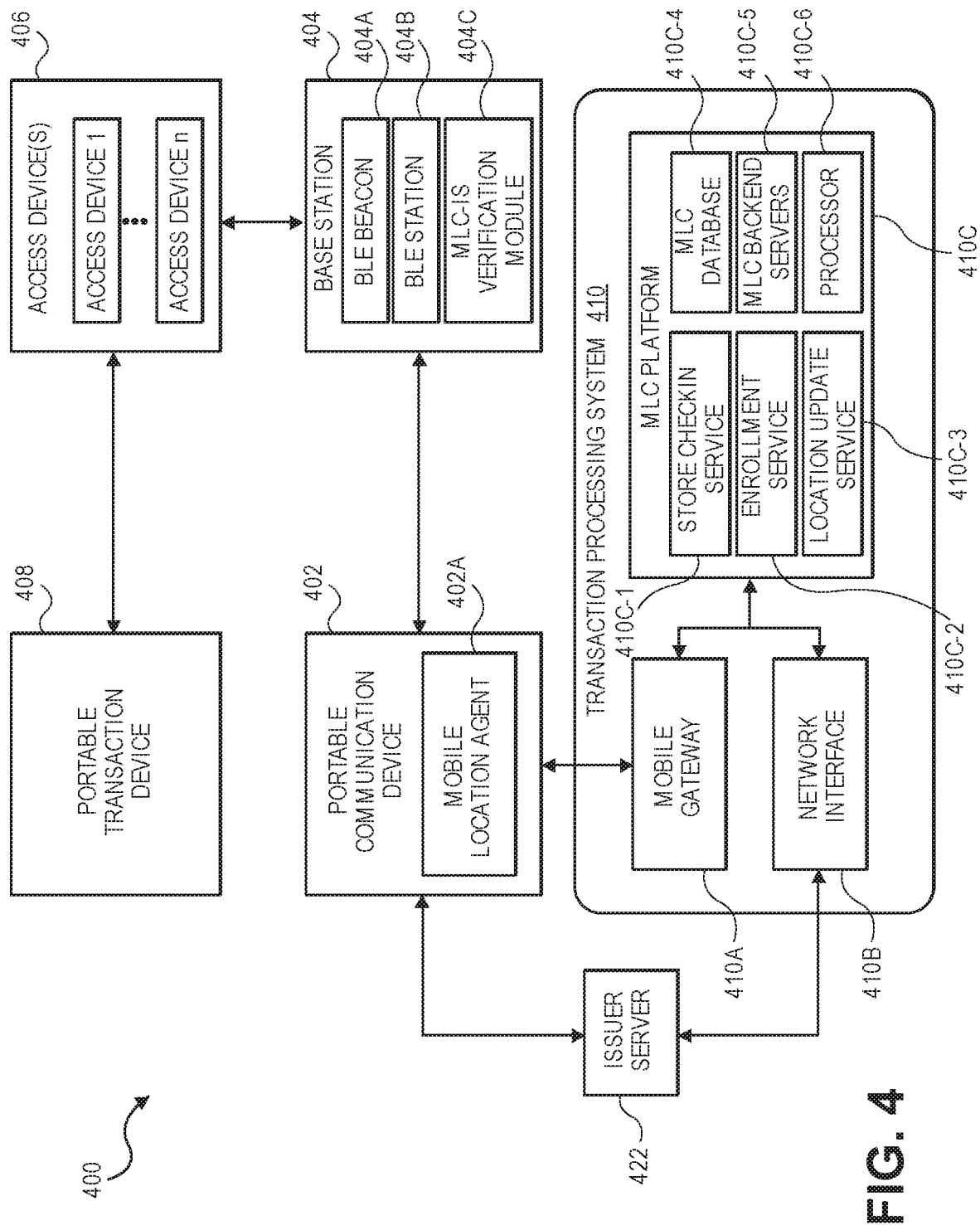
FIG. 4 illustrates a block diagram of a system, according to some embodiments of the invention.

FIG. 4 shows a block diagram of a system 400 according to an embodiment of the invention. The system includes a portable transaction device 408, one or more terminals 406, a base station 404, a portable communication device 402, an issuer server 422, and transaction processing system 410.

The access devices 406 may include verification processing to query the MLC-IS Verification Module to determine the user's physical presence in the store. Terminal verification result (TVR) bits can indicate that authentication has been performed. With these bits set, terminals can take the processing results into account while performing transactions. In other embodiments, the verification result may be carried in other data fields in the authorization request message.

The transaction processing system 410 comprises a mobile gateway 410A, a network interface 410B, and an MLC (mobile location confirmation) platform 410C in communication with each other. The MLC platform may also comprise a store check in service 410C-1, an enrollment service 410C-2, a location update service 410C-3, an MLC database 410C-4, MLC backend servers 410C-5, and one or more data processors 410C-6.

In some embodiments, the transaction processing system 410 may include data processing subsystems, networks, and operations used to support and deliver authorization services, exception file services, transaction scoring services, and clearing and settlement services. An exemplary transaction processing system may include VisaNet™. Transaction processing systems such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services.

In some embodiments, the store check in service 410C-1 (working in conjunction with the processor 410C-6) can decode the base64 strings of UUID major and minor into the binary strings using base64 data decoding. If the decoding fails, the store check in service 410C-1 can return a predetermined status code and the corresponding message as the API response. Otherwise, the store check in service 410C-1 searches for the primary account number(s) (PAN) and PAN expiration date that are associated with the device ID. If PAN(s) and PAN expiration date(s) are found, the store check in service 410C-1 can perform the following for each pair of PAN and PAN expiration date:

Format the PAN and PAN expiration date into a compressed numeric. Compressed numeric data elements consist of two numeric digits (having value in the range Hex '0'-'9') per byte. These data elements can be left justified and padded with trailing hexadecimal 'F's.

Generate a new random number and save the value for later use.

Concatenate from left to right the PAN, PAN expiration date, UUID, major and minor, all of which are in the binary format, and the random number generated Hash the result of the concatenation using the SHA-256 hashing algorithm to obtain the 32-byte hash result.

Convert the binary string of hash value into a Base64 string using Base64 data encoding.

The store check in service 410C-1 can return an encoding (e.g. Base64) of the string of hash value(s) and random number(s) generated for each pair of PAN and PAN expiration date found, and can also return the status code and the corresponding message as the API response. If PAN and PAN expiration date are not found, the store check in service 410C-1 can return the status code and the corresponding message as the API response.

The portable communication device 402 may comprise a mobile location agent 402A. The mobile location agent 402A may be programmed to provide for beacon detection capability—this capability is required to wake up or notify the mobile location agent 402A once the cardholder/mobile device owner enters into a merchant store where the beacon monitors. It may also provide for BLE connection management—the mobile location agent 402A can be used to set up and manage a BLE connection with the base station to send store check in information to the store controller BLE.

The base station 404 may be in any suitable form (e.g., a single device with a single housing, multiple devices with multiple housings, any suitable combination of software and/or hardware, etc.) comprise a BLE beacon 404A, a BLE station 404B, and an MLC verification module 404C. The BLE beacon 404A is a device that constantly advertises a predefined BLE data package. It can be used to notify the user's portable communication device when the user walks into a resource provider store (e.g., a merchant store). The BLE station 404A can be a device that exchanges information with the portable communication device 402 over the BLE channel. It is used to receive the cryptographic patterns from the portable communication device 402. The verification module 404C can be used to store the cryptographic patterns, receive the hash matching request from the access device, perform the hash matching, and return the hash matching results back to the access device. Although the verification module 404C is illustrated in the base station 404, it may be present in other devices (e.g., the access device) in other embodiments of the invention.

Figure 5:
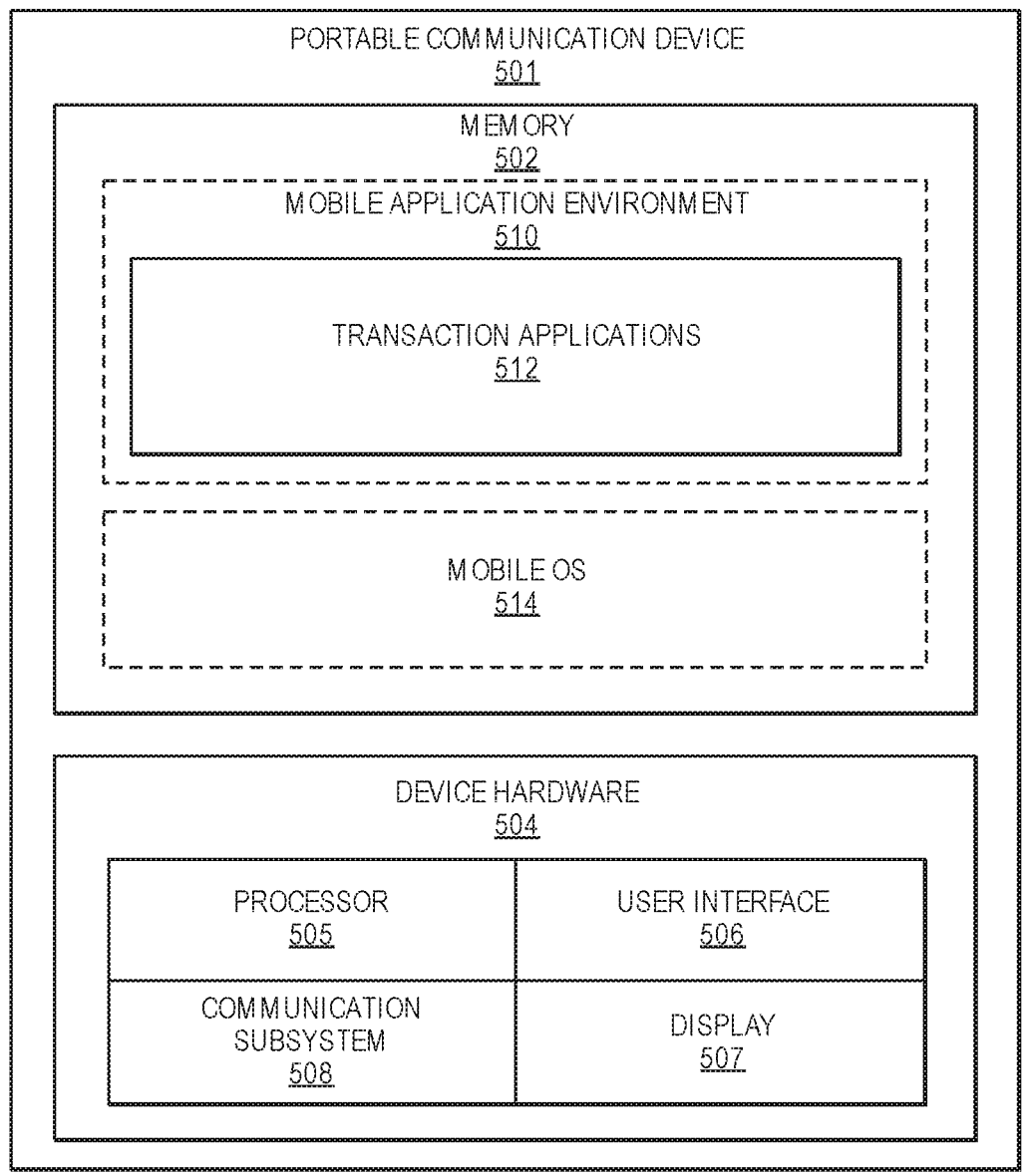
FIG. 5 shows a block diagram of a portable communication device according to an embodiment of the invention.

FIG. 5 illustrates a block diagram of a portable communication device 501, according to some embodiments. Portable communication device 501 may include device hardware 504 coupled to a memory 502. Device hardware 504 may include a processor 505, a communications subsystem 508, use interface 506, and a display 507 (which may be part of user interface 506). Processor 505 can be implemented as one or more integrated circuits (e.g., one or more single core or multicore microprocessors and/or microcontrollers), and is used to control the operation of portable communication device 501. Processor 505 can execute a variety of programs in response to program code or computer-readable code stored in memory 502, and can maintain multiple concurrently executing programs or processes. Communications subsystem 509 may include one or more RF transceivers and/or connectors that can be used by portable communication device 501 to communicate with other devices and/or to connect with external networks. User interface 506 can include any combination of input and output elements to allow a user to interact with and invoke the functionalities of portable communication device 501. In some embodiments, display 507 may be part of user interface 506.

Memory 502 can be implemented using any combination of any number of non-volatile memories (e.g., flash memory) and volatile memories (e.g., DRAM, SRAM), or any other non-transitory storage medium, or a combination thereof media. Memory 502 may store a mobile OS 514 and a mobile application environment 510 where one or more mobile applications reside 512 (e.g., a payment application such as a mobile wallet application, merchant application, mobile location application, etc.) to be executed by processor 505.

Figure 6:
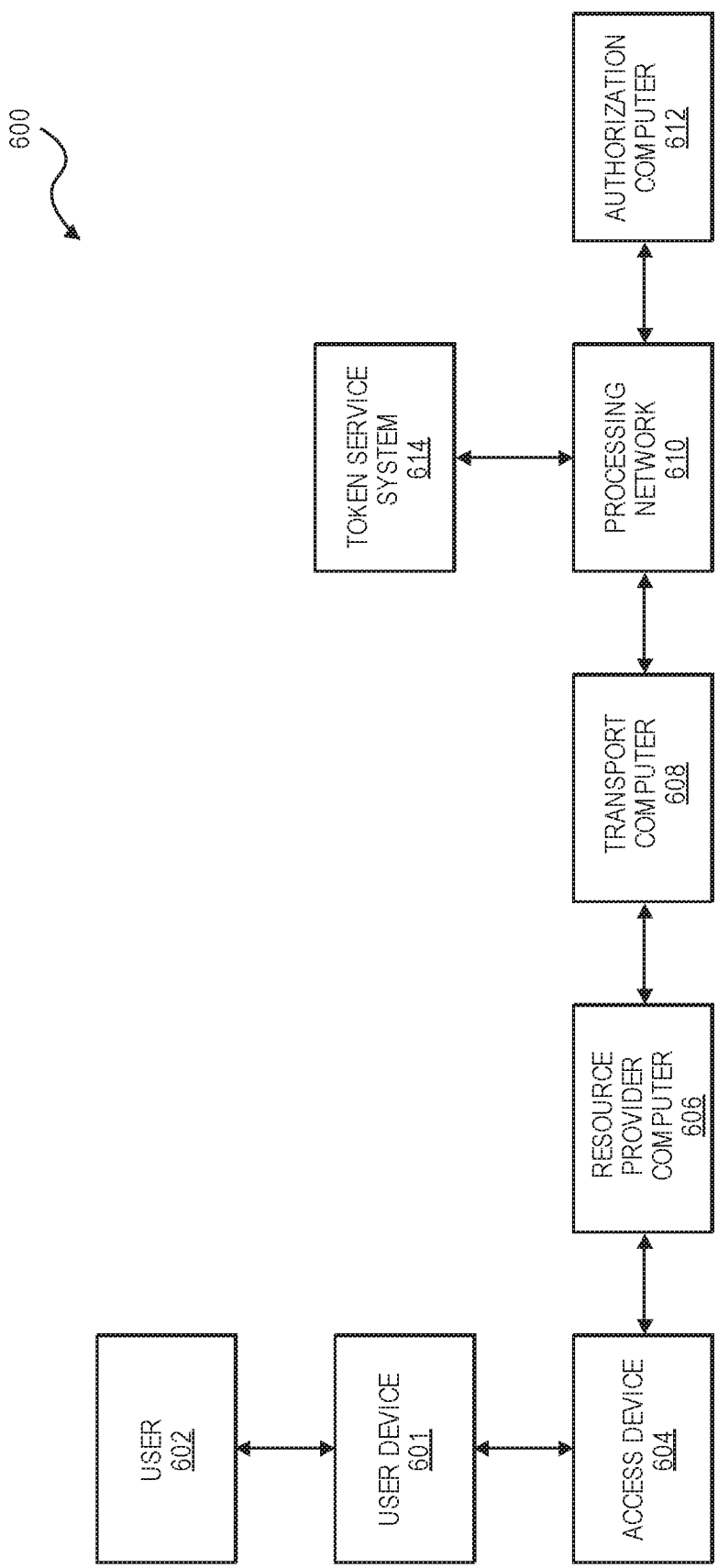
FIG. 6 shows a block diagram of an exemplary transaction processing system according to an embodiment of the invention.

FIG. 6 shows a diagram of a transaction processing system 600 that can incorporate any of the previously described systems. The transaction processing system 601 includes a user device 601 that is operated by a user 602. The user device can interact with an access device 604, and can be the previously described portable transaction device. The access device 604 is in communication with an authorization computer 612 via a resource provider computer 606, a transport computer 608, and a processing network 610. A token service system 614 may be in communication with the processing network 610 (or may be incorporated within it. The processing network 610 may include the previously described transaction processing system.

In a transaction conducted using the system 600, the user may use the user device 601 to interact with the access device 604. The access device may then generate and transmit an authorization request message to the processing network 610 via the resource provider computer 606 and transport computer 608. If the authorization request message contains a token such as a payment token, the processing network 610 may retrieve real credentials associated with the token from the token service system 614 and may replace the token with the real credentials in the authorization request message. The authorization request message may then be forwarded to the authorization computer 612 for an authorization decision.

After the authorization computer 612 makes the authorization decision, it returns an authorization response back to the access device 604 via the processing network 610, the transport computer 608, and the resource provider computer 606. If desired, the processing network 610 may replace the real credentials in the authorization response message with a previously provided token. As noted above, a clearing and settlement process may be subsequently performed.

Figure 7:
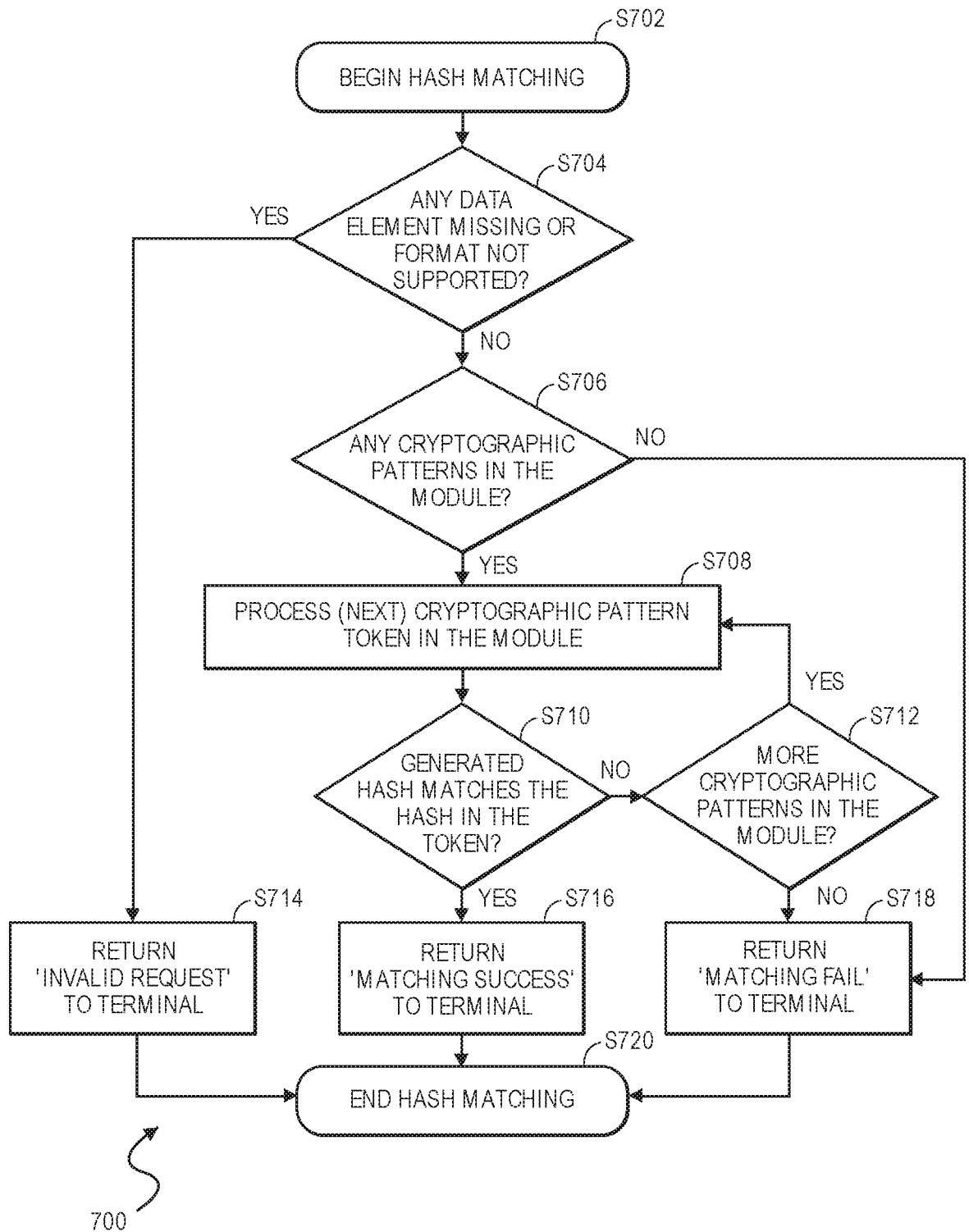
FIG. 7 shows a flowchart of a hash matching process according to an embodiment of the invention.

FIG. 7 shows a flowchart illustrating a hash matching process according to an embodiment of the invention. The hash matching process can be performed by a base station, access device, and/or transaction processing system, as described above in FIGS. 1 and 2.

At step S702, the hash matching process can begin.

At step S704, a decision is made, by a device, as to whether any data elements are missing and/or if the format is not supported. In step S714, if there are data elements that are missing and/or if the format is not supported, then an invalid request indicator is generated by the device.

At step S706, a decision is made, by the device, as to whether any cryptographic patterns are in the device being used.

At step S708, if there are cryptographic patterns in the device, the received cryptographic pattern is processed by the device.

At step S710, a determination is made by the device as to whether a generated cryptographic pattern matches a stored cryptographic pattern.

At step S716, if there is a match, then a success indicator may be created by the device.

At step S712, if there is not a match, the device determines if there are more cryptographic patterns in the module. In step S718, if there are no further cryptographic patterns to test, then a failure indicator may be generated.

At step S720, the cryptographic pattern matching process ends.

Some entities or components described herein may be associated with or operate one or more computer apparatuses to facilitate the functions described herein. Some of the entities or components described herein, including any server or database, may use any suitable number of subsystems to facilitate the functions.

Examples of such subsystems or components can be interconnected via a system bus. Additional subsystems such as a printer, keyboard, fixed disk (or other memory comprising computer readable media), monitor, which is coupled to display adapter, and others are shown. Peripherals and input/output (I/O) devices, which couple to I/O controller (which can be a processor or other suitable controller), can be connected to the computer system by any number of means known in the art, such as serial port. For example, serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium.

Embodiments of the invention provide for a number of advantages. For example, by using an in store base station, embodiments of the invention can accurately determine if an authentic user is actually conducting a transaction with a portable transaction device. A fraudster who does not have the user's portable communication device will not be able to conduct a transaction using the user's portable transaction device. Thus, unauthorized access to locations, unauthorized payment transactions, and unauthorized data requests can be prevented using embodiments of the invention. Further, as is apparent above, the verification of the user's authenticity at the location of the transaction can be verified before the user ever gets to the point of starting the transaction and the verification processing used in embodiments of the invention is secure. As a result, additional authentication processes (e.g., PIN or password requests, or signature) need not be used in embodiments of the invention. This reduces any friction that might be generated between the resource provider and the user as the result of the user not remembering his or her authentication data, or as a result of the increased transaction time that would otherwise result from additional authentication processing.

Messages between the computers, networks, and devices described herein may be transmitted using a secure communications protocols such as, but not limited to, File Transfer Protocol (FTP); HyperText Transfer Protocol (HTTP); Secure Hypertext Transfer Protocol (HTTPS); Secure Socket Layer (SSL), ISO (e.g., ISO 8583) and/or the like.

Other embodiments of the invention are also contemplated. Other embodiments of the invention may include the following:

An additional embodiment is directed to a method comprising: receiving, by a portable communication device from a base station, a resource provider identifier; transmitting, by the portable communication device, the resource provider identifier and device information to a transaction processing system, wherein the transaction processing system receives the resource provider identifier and device information.

Another embodiment of the invention can further include, wherein the transaction processing system generates a cryptographic pattern, and the method further includes: receiving the cryptographic pattern; and transmitting the cryptographic pattern to the base station, which transmits the cryptographic pattern to an access device, which generates another cryptographic pattern using data from a portable transaction device and thereafter determines if the authentic user is present, and transmits verification data to the transaction processing system.

Another embodiment of the invention can be directed to a portable communication device that includes code, executable by a processor, to perform the above described methods.

A further additional embodiment of the invention can be directed to a method comprising: receiving, by an access device, a first cryptographic pattern from a base station; determining a second cryptographic pattern from a received credential from a portable transaction device, and a stored resource provider identifier; comparing the first and second cryptographic patterns; and determining verification data based upon comparing the first and second cryptographic patterns.

Other embodiments include an access device comprising code, executable by the processor, for performing the above-described method.

Still another embodiment of the invention can be directed to a method comprising: receiving, by a portable communication device, a resource provider identifier from a base station; transmitting the resource provider identifier and device information to a transaction processing system; receiving, by the portable communication device, from the transaction processing system, a token and a first biometric template; and transmitting, the token and the first biometric template to the base station. The base station may cause a biometric acquisition device to capture a second biometric template of the user and may compare them. If they match, then the token may be provided to an access device to complete a transaction.

Other embodiments are directed to portable communication devices comprising code, executable by a processor, for performing the above-noted method.

Still another embodiment of the invention is directed to a method comprising: providing by a base station, a resource provider identifier to a portable communication device; receiving, from the portable communication device, a first biometric template and a token; causing a biometric acquisition device to produce a second biometric template; comparing the first and second biometric templates; and if the first and second biometric templates match, then providing the token to an access device.

Other embodiments are directed to portable communication devices comprising code, executable by a processor, for performing the above-noted method.

Specific details regarding some of the above-described aspects are provided above. The specific details of the specific aspects may be combined in any suitable manner without departing from the spirit and scope of embodiments of the invention. For example, although the embodiments described above relate to authentication processing, other types of processing can be performed using embodiments of the invention. For example, since embodiments of the invention can verify that a user is actually at a specific location, embodiments of the invention could also be used to provide incentives or rewards to a user.

It should be understood that the present invention as described above can be implemented in the form of control logic using computer software (stored in a tangible physical medium) in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, by a server computer, device information and a resource provider identifier from a portable communication device of a user, wherein the resource provider identifier was received by the portable communication device from a base station at a resource provider location identified by the resource provider identifier;
   determining a credential or token associated with the portable communication device;

storing the received resource provider identifier, the credential or the token, and an additional resource provider identifier associated with the base station together in a database;

receiving, by the server computer and from an access device in a transaction, an authorization request message comprising the credential or the token, and the additional resource provider identifier; and analyzing, by the server computer, the authorization request message to determine if the user of the portable communication device is also conducting the transaction at the access device, by determining the resource provider identifier from the credential or token in the authorization request message, and determining if the resource provider identifier is associated with the additional resource provider identifier in the authorization request message.

2. The method of claim 1, wherein the resource provider identifier is in the form of a base station identifier, wherein the base station only advertises a presence of the base station and does not receive signals from the portable communication device.

3. The method of claim 1, wherein the portable communication device is a mobile phone.

4. The method of claim 1, wherein the base station and the access device are both at the resource provider location.

5. The method of claim 1, further comprising:
validating, by the server computer, the device information.

6. The method of claim 1, wherein the portable communication device communicates with the access device using a contactless based method.

7. The method of claim 1, wherein the additional resource provider identifier is a terminal ID.

8. The method of claim 1, further comprising:
transmitting an authorization response message to the access device.

9. The method of claim 1, wherein the base station and the portable communication device communicate using Bluetooth low energy (BLE).

10. The method of claim 1, wherein the determining the credential or token comprises determining the token, wherein storing the credential or token comprises storing the token, and wherein the authorization request message comprises the token.

11. A server computer comprising:
a processor; and
a computer readable medium coupled to the processor, the computer readable medium comprising code executable by the processor, to cause the processor to implement a method comprising:
receiving device information and a resource provider identifier from a portable communication device of a user, wherein the resource provider identifier was received by the portable communication device from a base station at a resource provider location identified by the resource provider identifier, determining a credential or token associated with the portable communication device;

storing the received resource provider identifier, the credential or the token, and an additional resource provider identifier associated with the base station together in a database;

receiving from an access device in a transaction, an authorization request message comprising the credential or the token, and the additional resource provider identifier; and analyzing the authorization request message to determine if the user of the portable communication device is also conducting the transaction at the access device, by determining the resource provider identifier from the credential or token in the authorization request message, and determining if the resource provider identifier is associated with the additional resource provider identifier in the authorization request message.

12. The server computer of claim 11, wherein the resource provider identifier is in the form of a base station identifier, wherein the base station only advertises a presence of the base station and does not receive signals from the portable communication device.

13. The server computer of claim 11, wherein the portable communication device is a mobile phone.

14. The server computer of claim 11, wherein the base station and the access device are both at the resource provider location.

15. The server computer of claim 11, wherein the method further comprises:
validating the device information.

16. The server computer of claim 11, wherein the portable communication device communicates with the access device using a contactless based method.

17. The server computer of claim 11, wherein the additional resource provider identifier is a terminal ID.

18. The server computer of claim 11, wherein the method further comprises:
transmitting an authorization response message to the access device.

19. The server computer of claim 11, wherein the base station and the portable communication device communicate using Bluetooth low energy (BLE).

20. The server computer of claim 11, wherein the determining the credential or token comprises determining the token, wherein storing the credential or token comprises storing the token, and wherein the authorization request message comprises the token.

* * * * *